United States Patent [19]
Itzov

[11] Patent Number: 5,829,333
[45] Date of Patent: Nov. 3, 1998

[54] BEVEL ANGLE ADJUSTMENT MECHANISM FOR A COMPOUND MITER SAW

[75] Inventor: Andrew L. Itzov, Menomonee Falls, Wis.

[73] Assignee: Milwaukee Electric Tool Corporation, Brookfield, Wis.

[21] Appl. No.: 679,741

[22] Filed: Jul. 15, 1996

Related U.S. Application Data

[63] Continuation of Ser. No. 272,765, Jul. 8, 1994, abandoned.

[51] Int. Cl.⁶ ...................................................... B27B 5/20
[52] U.S. Cl. ........................... 83/471.3; 83/473; 83/477.1; 83/490; 83/581; 83/698.11
[58] Field of Search .................................. 83/471.3, 473, 83/477.1, 486.1, 490, 581, 676, 698.11, 698.31, 698.41, 698.51, 699.51; 30/376; 403/111, 112, 113, 117

[56] References Cited

U.S. PATENT DOCUMENTS

| | | | |
|---|---|---|---|
| D. 306,031 | 2/1990 | Ushiwata et al. | D15/133 |
| 4,537,105 | 8/1985 | Bergler | 83/471.3 |
| 4,869,142 | 9/1989 | Sato et al. | 83/467.1 |
| 4,934,233 | 6/1990 | Brundage et al. | 83/581 X |
| 5,054,352 | 10/1991 | Fushiya et al. | 83/468.3 |
| 5,060,548 | 10/1991 | Sato et al. | 83/471.003 |
| 5,063,802 | 11/1991 | Shiotani et al. | 83/98 |
| 5,063,805 | 11/1991 | Brundage | 83/468.3 |
| 5,146,825 | 9/1992 | Dehari | 83/397 |
| 5,181,448 | 1/1993 | Terpstra | 83/468.3 |
| 5,216,964 | 6/1993 | Sato et al. | 83/473 X |
| 5,392,678 | 2/1995 | Sasaki et al. | 83/471.3 |
| 5,437,214 | 8/1995 | Sasaki et al. | 83/471.3 |
| 5,464,184 | 11/1995 | Folci | 248/425 |

FOREIGN PATENT DOCUMENTS

| | | | |
|---|---|---|---|
| 547280 | 5/1956 | Belgium | 83/477.1 |
| 0 271 755 | 11/1987 | European Pat. Off. | |

*Primary Examiner*—Clark F. Dexter
*Attorney, Agent, or Firm*—Michael Best & Friedrich LLP

[57] ABSTRACT

A miter saw including a base having a support surface for supporting thereon a workpiece. A turntable is mounted on the base for rotation about a vertical axis and a support is mounted on the turntable for movement therewith. A cutting unit is mounted on the support for pivotal movement about a first horizontal axis between a cutting position and a non-cutting position and a bevel mechanism connects the cutting unit to the support to allow pivotal movement of the cutting unit about a horizontal bevel angle axis perpendicular to the first horizontal axis such that the movement is in a first direction from a vertical position through a range greater than 45° from vertical, and in a second direction opposite to the first direction and beyond vertical, such that the cutting unit is adjustable to allow compound miter cutting of the workpiece at an expanded range of bevel angle positions beyond the vertical and 45° bevel angle positions.

16 Claims, 4 Drawing Sheets

5,829,333

BEVEL ANGLE ADJUSTMENT MECHANISM FOR A COMPOUND MITER SAW

This is a continuation of application Ser. No. 08/272,765, filed Jul. 8, 1994 "BEVEL ANGLE ADJUSTMENT MECHANISM FOR A COMPOUND MITER SAW", now abandoned.

BACKGROUND OF THE INVENTION

The invention relates to miter saws and, in particular, to a bevel angle adjustment mechanism for a compound miter saw.

Compound miter saws typically include a base having a support surface for supporting a workpiece. A turntable is mounted on the base for rotation about a vertical axis. The turntable typically includes a support mounted on the turntable for rotation and a cutting unit is connected to the support for pivotal movement about a first horizontal axis between non-cutting and cutting positions. The cutting unit is also connected to the support for pivotal movement about a horizontal bevel angle axis to allow compound miter cutting of the workpiece. Prior art constructions allow adjustment of the cutting unit about the bevel angle axis from a 0° bevel angle, wherein the cutting unit is in a vertical position, to a 45° (from vertical) bevel angle position. Adjustment through this range allows the user to make bevel angle cuts of the workpiece at any angle between 0° and 45°.

Occasionally, the need arises to cut the workpiece at a bevel angle of less than 0° or greater than 45°. This need typically arises when cutting a piece of molding or trim to fit into the corner of a room that is not true, i.e., the walls of the room do not meet in the corner at exactly 90° relative to one another.

In other cases, when attempting to join the pieces of wood together, it is necessary to engage in a practice commonly known as back-cutting of the workpiece. By way of example, in order to join two pieces of base board together end-to-end to form a smooth continuous outer surface, it is common to file or cut off the back of the boards leaving an edge at the outer (exposed) surface of each board that can be joined together to form the smooth continuous outer surface. This process of back-cutting can be time consuming.

SUMMARY OF THE INVENTION

The invention provides a miter saw including a base having a support surface for supporting a workpiece and a turntable mounted on the base for rotation about a generally vertical axis. A support is mounted on the turntable for rotation therewith and a cutting unit is connected to the support for pivotal movement about a first horizontal pivot axis between non-cutting and cutting positions. The cutting unit is also pivotable about a second horizontal axis or bevel angle axis which is perpendicular to the vertical plane in which the first horizontal axis lies. Adjustment of the cutting unit about the bevel angle axis allows compound miter cutting of the workpiece.

The miter saw also includes a bevel angle adjustment mechanism which connects the cutting unit to the support and allows selective adjustment of the cutting unit about the bevel angle axis. The bevel angle adjustment mechanism allows adjustment of the cutting unit between a −5° (relative to vertical) bevel angle position and a 50° (relative to vertical) bevel angle position thereby allowing cutting of a workpiece at bevel angles beyond 0° (vertical) in one direction and beyond 45° (i.e. greater than 45°) in the opposite direction and also allowing use of the saw to back-cut a workpiece.

The bevel angle adjustment mechanism includes a spring member mounted between the support and the cutting unit. The spring member is mounted between the support and the cutting unit so that the cutting unit is freely manually movable within a range of 0° (vertical) and 45° and is adjustable against the biasing force of the spring in one direction from 0° (vertical) to −5° from vertical, and against the biasing force of the spring member in the opposite direction from a bevel angle position of 45° from vertical to a position 50° from vertical.

A principal advantage of the invention is the provision of a miter saw having a bevel angle adjustment mechanism allowing adjustment of the cutting unit about the bevel angle axis beyond the bevel angle position that is 45° from vertical in one direction to a position 50° from vertical and beyond vertical in the opposite direction to a bevel angle position −5° from vertical.

Other features and advantages of the invention will become apparent to those skilled in the art upon review of the following detailed description, claims and drawings.

Figure 1:
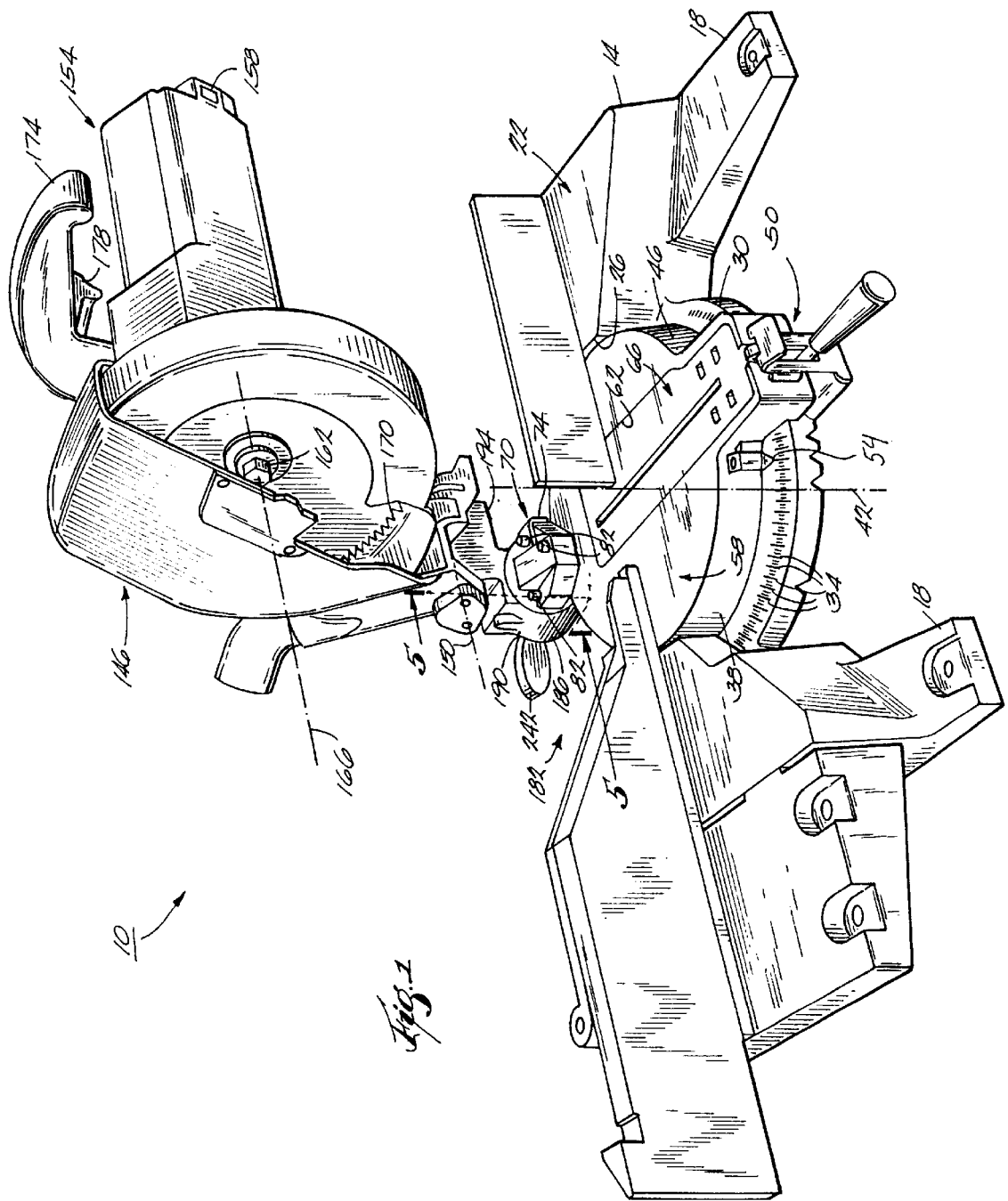
FIG. 1 is a perspective view of a miter saw embodying the invention.

Before one embodiment of the invention is explained in detail, it is to be understood that the invention is not limited in its application to the details of construction and the arrangement of components set forth in the following description or illustrated in the drawings. The invention is capable of other embodiments and of being practiced or of being carried out in various ways. Also, it is to be understood that the phraseology and terminology used herein is for the purpose of description and should not be regarded as limiting.

DETAILED DESCRIPTION OF THE PREFERRED EMBODIMENT

Shown in FIG. 1 of the drawings is a miter saw 10 embodying the invention. The miter saw 10 includes a base 14 having four feet 18 (only two of which are shown in FIG. 1) supporting the miter saw 10 on a surface (not shown). The base 14 defines a workpiece support surface 22, a generally circular aperture 26 in the workpiece support surface 22 and a skirt 30 surrounding a portion of the aperture 26. The skirt 30 includes a plurality of markings 34.

The miter saw 10 also includes a turntable 38 mounted in the generally circular aperture 26 of the base 14. The turntable 38 is connected to the base 14 for pivotal movement relative to the base 14 about a vertical axis 42. The turntable 38 includes a periphery 46. A locking mechanism 50 is also provided for locking the turntable 38 in any desired angular position relative to the base 14 and a pointer 54 which, in combination with the markings 34 on the skirt 30 of the base 14, indicate the particular miter angle to which the turntable 38 has been adjusted relative to the base 14.

The turntable 38 also includes a workpiece support surface 58. The workpiece support surface 58 of the turntable 38 forms, with the workpiece support surface 22 of the base 14, a smooth continuous upper surface. An aperture 62 is provided in the workpiece support surface 58 of the turntable 38 and a kerf plate 66 is housed in the aperture 62 to support the workpiece during cutting of the workpiece.

The miter saw 10 also includes a support 70 mounted on the turntable 38 for movement therewith about the vertical axis 42. The support 70 includes a mounting block 74, and three bores (not shown) extend through the mounting block 74. Three threaded bolts 82 extend through the respective bores in the mounting block and into the turntable 38 to secure the support 70 to the turntable 38.

Figure 2:
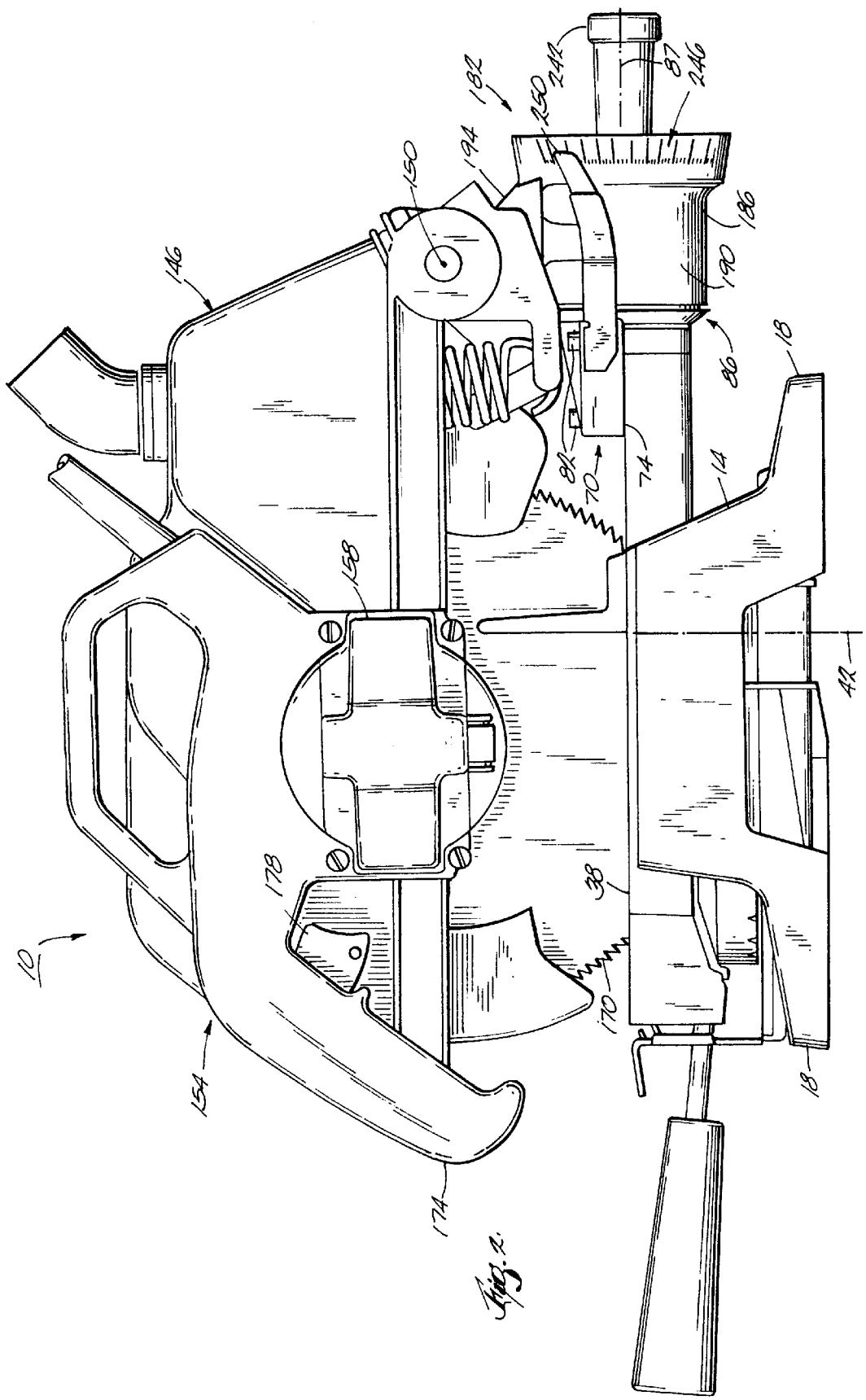
FIG. 2 is a right side elevational view of the miter saw showing the cutting unit in the cutting position.
Figure 5:
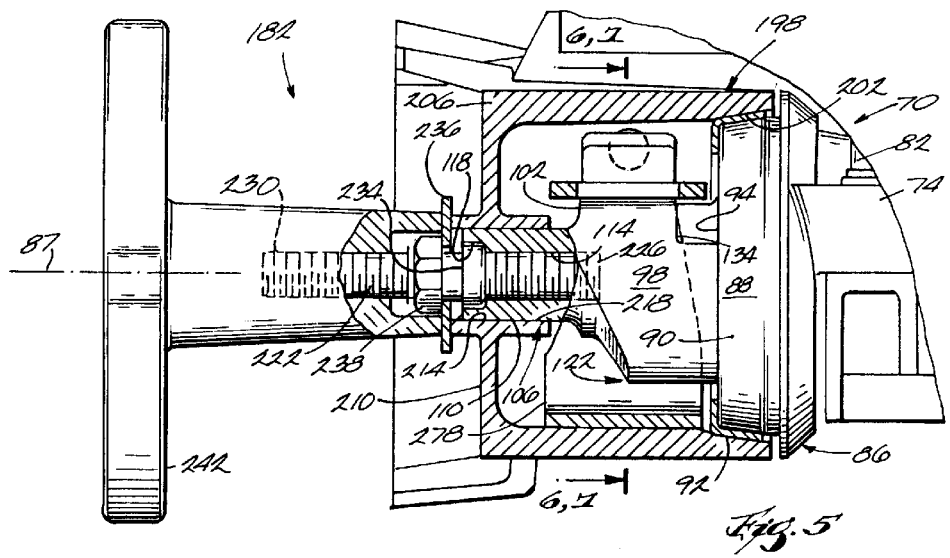
FIG. 5 is an enlarged, partial cross-section taken along line 5—5 in FIG. 1 and showing the bevel angle adjustment mechanism of the miter saw.
Figures 6, 7:
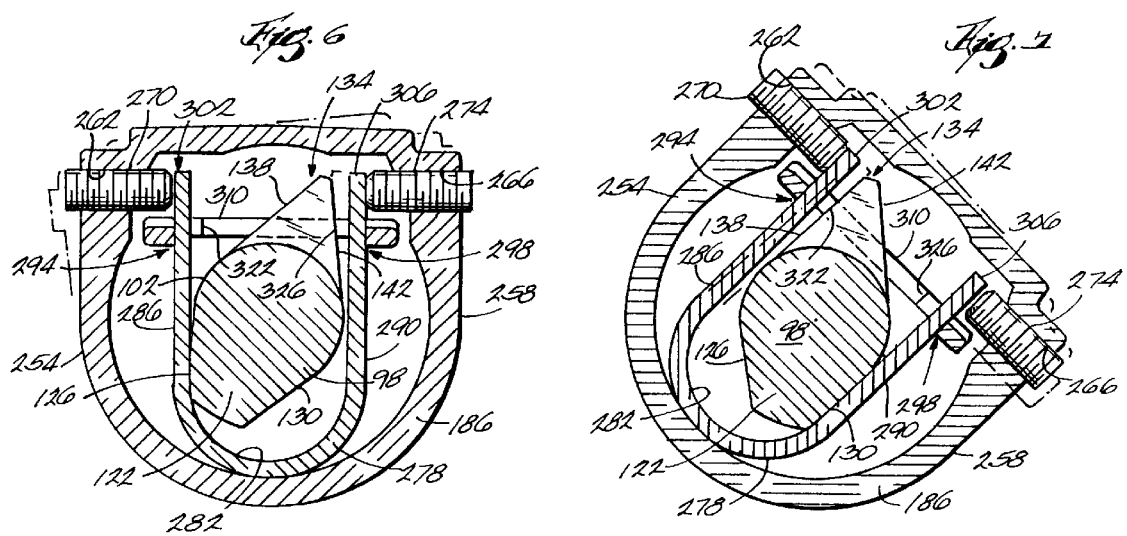
FIG. 6 is a view taken along line 6—6 in FIG. 5 showing the position of the bevel angle adjustment mechanism when the cutting unit is in the vertical position.
FIG. 7 is a view taken along line 7—7 in FIG. 5 showing the position of the bevel angle adjustment mechanism when the cutting unit is in the 45° bevel angle position.

Referring now to FIGS. 2 and 5, the support 70 includes a rearwardly extending support member 86 centered on a horizontal bevel angle axis 87. The support member 86 includes a rearwardly (to the left in FIG. 5) axially extending frustoconical portion 88 defining a tapered annular bearing surface 90. An annular bushing 92 is mounted on the bearing surface 90. The frustoconical portion 88 includes a rearward surface 94 and a pivot member 98 extends rearwardly from the rearward surface 94 of the frustoconical portion 88 and includes an eccentrically shaped central portion 102 adjacent the rearward surface 94 and an end portion 106 having a generally cylindrical outer surface 110 spaced from the rearward surface 94. A threaded bore 114 extends axially into the cylindrical end portion 106 of the pivot member 98. The threaded bore 114 includes a stepped end portion 118 adjacent the end portion 106 of the pivot support. As shown in FIGS. 6 and 7, the eccentrically shaped central portion 102 of the pivot member 98 includes a lower, truncated V-shaped portion 122 having left and right surfaces 126 and 130, respectively. The central portion 102 also includes an upper, inverted V-shaped portion 134 having left and right surfaces 138 and 142, respectively.

The miter saw 10 also includes a cutting unit 146 (FIG. 1) connected to the support 70 for movement about a horizontal axis 150 perpendicular to the bevel angle axis 87 between a cutting position and a non-cutting position. The cutting unit 146 includes a housing 154 supporting a saw motor 158 and an arbor 162 drivingly connected to the saw motor 158 for rotation about the arbor axis 166. A saw blade 170 is mounted on the arbor 162 for rotation about the arbor axis 166. The housing 154 also includes a handle 174 for lowering the cutting unit 146 from the non-cutting position to the cutting position. The handle 174 includes a switch 178 electrically connected to the saw motor 158 to actuate the motor 158 and the saw blade 170 to cut the workpiece.

As shown in FIGS. 1, 2 and 5, the miter saw 10 also includes a bevel angle adjustment mechanism 182 which connects the cutting unit 146 to the support 70 and allows adjustment of the cutting unit 146 about the bevel angle axis 87 of the miter saw 10. The bevel angle adjustment mechanism 182 includes a generally cylindrical housing 186 having an outer surface 190 (FIG. 2) and a pivot member 194 connected to the outer surface 190. The cutting unit 146 is pivotally connected to the pivot member 194 for movement about the horizontal axis 150 between the cutting and non-cutting positions.

The housing 186 includes a first end portion 198 (FIG. 5) defining a tapered inner bearing surface 202 engaging the bushing 92 on the support member 86 for pivotal movement of the housing 186 relative to the support member 86. The bushing is preferably formed from a metal different from the metal forming the bearing surfaces 90 and 202. In this position, the bushing 92 prevents galling that might otherwise occur between the bearing surfaces 90 and 202 as a result of the direct engagement of bearing surface 90 with the bearing surface 202. The housing 186 also includes an opposite end portion 206 having an end wall 210 and an aperture 214 centrally positioned in the end wall 210 and relative to the bevel angle axis 87 so that the end portion 106 of support member 86 extends through the aperture 214. The housing 186 includes an inner bearing surface 218 which engages the outer surface 110 of the cylindrical end portion 106 of the pivot member 98 to support the housing 186 on the support 70 for pivotal movement about the bevel angle axis 87.

A threaded rod 222 extends into the threaded bore 114. The threaded rod 222 includes opposite threaded end portions 226 and 230 and a shoulder portion 234 centrally positioned between the end portions 226 and 230. The threaded end portion 226 is threaded into the threaded bore 114 so that the shoulder portion 234 fits into the stepped end portion 118 of the threaded bore 114 and acts as a positive stop to accurately position the threaded rod 222 during assembly of the miter saw 10. A washer 236 is placed on the end portion 230 of the threaded rod 222 adjacent the shoulder portion 234 and a nut 238 and a threaded handle 242 are threaded onto the end portion 230 of the threaded rod 222 to secure the housing 186 to the support 70 thereby securing the cutting unit 146 to the support 70. The threaded handle 242 can be rotated to loosen the engagement between the housing 186 and the support member 86 and thereby allow adjustment of the position of the housing 186 and the cutting unit 146 about the bevel angle axis 87 and relative to the support member 86. Rotation of the handle 242 in the opposite direction secures the cutting unit 146 in the selected angular position relative to the bevel angle axis 87. As shown in FIG. 2, a scale 246 representing a range of selected bevel angles is provided on the outer surface 190 of the cylindrical housing 186 and a pointer 250 is mounted on the support 70 to indicate, in combination with the scale 246 the selected bevel angle to which the cutting unit 146 has been adjusted relative to the support 70.

As shown in FIG. 6 and 7 of the drawings, the bottom portion of the housing 186 has a U-shaped, cross-section. The housing 186 includes opposite side portions 254 and 258 and threaded bores 262 and 266 extend through the side portions 254 and 258, respectively. Threaded stop members 270 and 274 are threaded into the threaded bores 262 and 266, respectively.

The bevel angle adjustment mechanism 182 also includes a U-shaped spring member 278 mounted inside the housing 186 between the pivot member 98 of the support member 86 and the housing 186 to substantially surround the eccentrically shaped central portion 102 of the pivot member 98. The spring member 278 has an inner surface 282 and has a left leg 286 and a right leg 290 each of which has an end portion, 294 and 298, respectively. The end portions 294 and 298 include upwardly extending ends or tabs 302 and 306.

Figure 8:
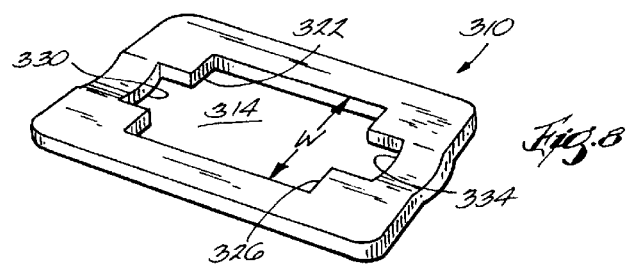
FIG. 8 is a perspective view of the keeper plate of the miter saw.

The bevel angle adjustment mechanism 182 also includes a keeper plate 310. As best shown in FIG. 8, the keeper plate 310 is a generally planar rectangular shaped member. The keeper plate 310 has therein a generally rectangular aperture 314 having a predetermined width W. The aperature 314 has opposite end portions 322 and 326 and recesses 330 and 334 in the end portions 322 and 326, respectively. The recesses 330 and 334 have a width which is less than the predetermined width W of the rectangular aperture 314 in the keeper plate 310. The tabs 302 and 306 of the U-shaped spring member 278 extend through the aperture 314 in the keeper plate 310 so that the tabs 302 and 306 fit within the respective recesses 330 and 334 and maintain the U-shaped spring member 278 in compression. As shown in FIGS. 6 and 7, the upper portion 134 of the eccentrically shaped central portion 102 of the pivot member 98 is positioned between the end portions 294 and 298 of the spring member 278 and, like the end portions 294 and 298, extends upwardly through the aperture 314 in the keeper plate 310. The upper portion 134 has a width which is less than the width W of the aperture 314 in the keeper plate 310 but which is greater than the width of the recesses 330 and 334.

Figure 3:
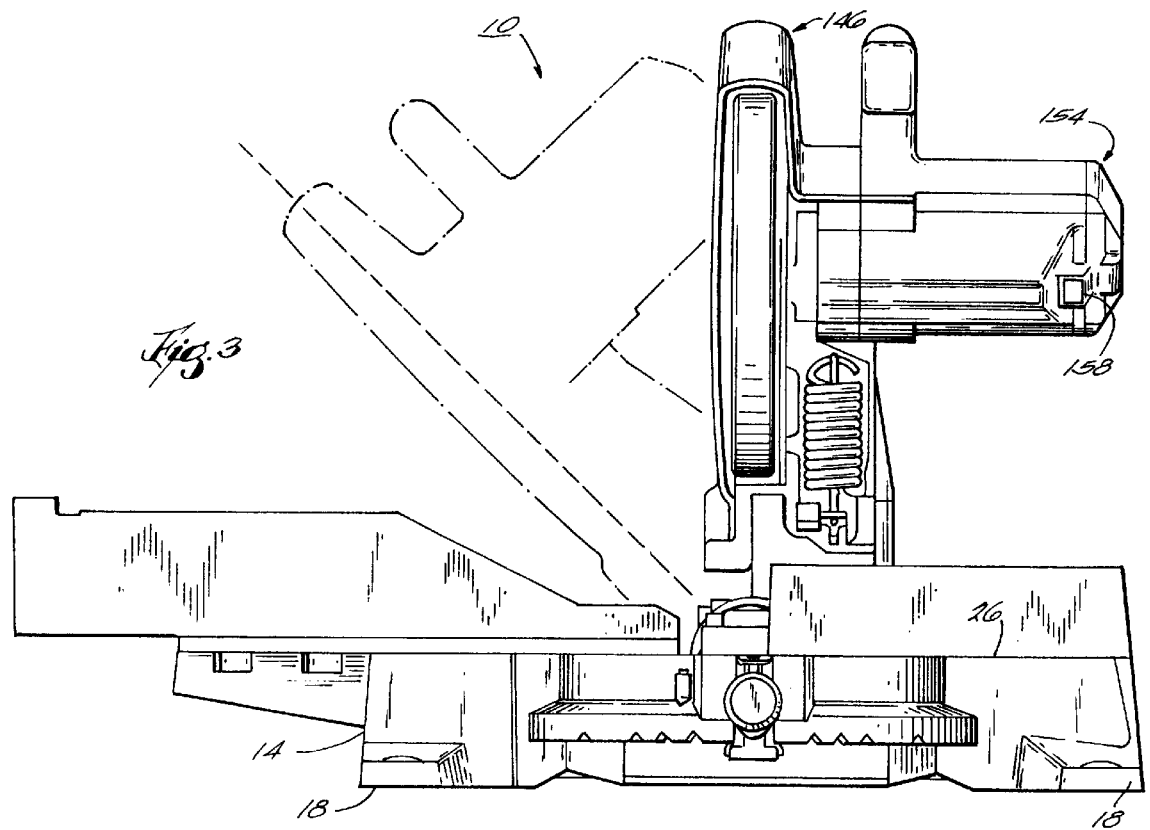
FIG. 3 is a front elevational view of the miter saw showing the cutting unit in the vertical, non-cutting position and, in phantom, in the 45° non-cutting position.

As illustrated in FIGS. 6 and 7, the housing 186 is freely pivotally movable about the bevel angle axis 87 between the vertical position (FIG. 6) wherein the cutting unit 146 is vertically oriented (FIG. 4) for conventional miter cutting of the workpiece, and a transverse, 45° bevel angle axis position (FIG. 7) wherein the cutting unit 146 is at an angle of 45° from vertical (shown in phantom in FIG. 3). The U-shaped spring member 278 moves with or "floats" between the positions illustrated in FIGS. 6 and 7 and, between the 0° (vertical) position and the 45° position, and does not aid or hinder movement of the housing 186 about the bevel angle axis 87. As shown in FIG. 6, when the cutting unit 146 is in the vertical position, the inner surface 282 of the spring member 278 adjacent the left leg 286 of the spring member 278 engages the surface 126, and the end portion 326 in the keeper plate 310 engages the surface 142 to prevent the spring member 278 from any additional counter-clockwise (in FIG. 6) rotation about the bevel angle axis 87. In this vertical position, stop member 274 engages the right tab 306 of the U-shaped spring member 278 to provide a positive resistance against over rotation of the cutting unit 146 (i.e., rotation beyond vertical to a negative bevel angle axis position (to the right in FIG. 3)). The cutting unit 146 is further manually adjustable about the bevel angle axis 87, beyond the vertical position and against the biasing force of the U-shaped spring member 278. When this occurs, the stop member 274 forces the right tab 306 of the spring member 278 toward the surface 142 (shown in phantom in FIG. 6). The cutting unit 146 is adjustable beyond vertical only to the position where the inner surface 282 adjacent the right tab 306 of the spring member 278 engages the surface 142. In the embodiment shown in the drawings, this occurs at approximately −5° from vertical (the position of the stop member 274 and right tab 306 are shown in phantom in FIG. 6).

Likewise, as shown in FIG. 7, when the cutting unit 146 is in the 45° bevel angle axis position, the inner surface 282 adjacent the right leg 290 of the spring member 278 engages the surface 130 and the end portion 322 of the aperture 314 in the keeper plate 310 engages the surface 138 to prevent the spring member 278 from any additional clockwise (in FIG. 7) rotation about the bevel angle axis 87. In this position, the stop member 270 engages the left tab 302 of the U-shaped spring member 278 to provide a positive resistance to rotation of the cutting unit 146 beyond the 45° bevel angle axis position. The cutting unit 146 is also adjustable beyond the 45° bevel angle position to a position approximately 50° from the vertical position and against the biasing force of the U-shaped spring member 278. When this occurs, the stop member 270 forces the left tab 302 of the spring member 278 toward the surface 138 (shown in phantom in FIG. 7). The cutting unit 146 is adjustable beyond 45° from vertical only to the position where the left tab 302 of the spring member 278 engages the surface 138. In the embodiment shown in the drawings, this engagement occurs when the cutting unit 146 is approximately 50° from vertical.

Figure 4:
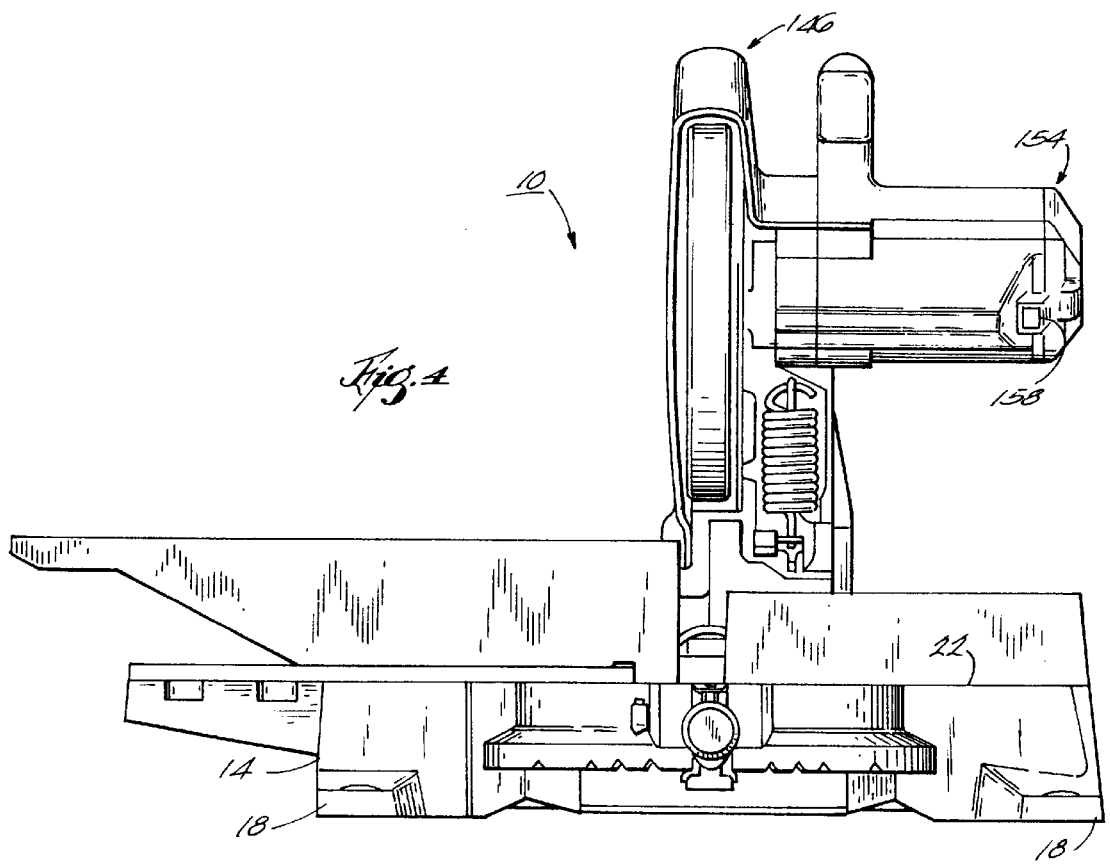
FIG. 4 is a front elevational view of the miter saw showing the cutting unit in the vertical, non-cutting position and showing the fence in the conventional miter cutting position.

In operation, if it is desired to engage in conventional miter cutting of a workpiece, the cutting unit 146 is positioned as shown in FIG. 4 so that the cutting unit 146 is in the vertical position. In this position, if necessary, the handle 242 of the bevel angle adjustment mechanism 182 can be turned to loosen the housing 186 from the support member 86 to allow adjustment of the cutting unit 146 beyond vertical to a position between vertical and a −5° bevel angle axis position. When the saw is in the appropriate position, as indicated by the bevel angle axis indicator, the handle 242 can be engaged to secure the housing 186 and the cutting unit 146 in the correct position. When the handle 242 is loosened, the housing 186 will return under the influence of the biasing force of the spring member 278 to the vertical position and may then be adjusted between the vertical and 45° bevel angle position to allow compound miter cutting of the workpiece.

If it is desired to cut the workpiece at angles of greater than 45°, i.e., 45°–50° from vertical, then the cutting unit 146 is first positioned in the 45° bevel angle position and is forced against the biasing force of the spring member 278 to the desired bevel angle position. When the desired position is reached, the handle 242 can be actuated to secure the housing 186 relative to the support member 86 thereby securing the cutting unit 146 in the correct bevel angle position. When the handle 242 is again released, the cutting unit 146 will return, under the influence of the biasing force of the spring member 278, to the 45° bevel angle position and the cutting unit 146 is again freely adjustable between the 45° bevel angle position and the vertical position.

Various features and advantages of the invention are set forth in the following claims.

I claim:

1. A miter saw comprising:

a base having a horizontal support surface for supporting a workpiece;

a turntable mounted on the base for rotation about a vertical axis;

a support mounted on the turntable for movement therewith;

a bevel angle adjustment mechanism mounted on the support and including a housing pivotally movable with respect to the support about a horizontal bevel angle axis, and further including a biasing mechanism mounted on the support between the housing and the support; and a cutting unit mounted on the housing for pivotal movement about a horizontal axis perpendicular to the bevel angle axis between a cutting position and a non-cutting position; the cutting unit including a cutting blade, and the bevel angle adjustment mechanism supporting the cutting unit for unbiased movement relative to the horizontal support surface about the horizontal bevel angle axis between a vertical, 0° bevel angle blade position relative to the horizontal support surface and a transverse, 45° bevel angle blade position and, when the cutting unit is in the transverse, 45° bevel angle blade position, supporting the cutting unit such that the cutting unit is adjustable against the biasing force of the biasing mechanism from the transverse blade position to approximately a 50° bevel angle blade position.

2. The miter saw as set forth in claim 1 wherein the bevel angle adjustment mechanism includes means for selectively securing the housing in a desired bevel angle position to fix the bevel angle blade position of the cutting unit.

3. The miter saw as set forth in claim 1 wherein the support includes an outer, frustoconical bearing surface and the housing includes an inner, frustoconical bearing surface mounted on the outer, frustoconical bearing surface such that the inner and outer bearing surfaces move relative to one another.

4. The miter saw as set forth in claim 2 further comprising a bushing mounted between the inner and outer frustoconical bearing surfaces.

5. The miter saw as set forth in claim 1 wherein, when the cutting unit is in the vertical blade position relative to the horizontal support surface, said bevel angle adjustment mechanism also supports the cutting unit for movement against the biasing force of the biasing mechanism from the vertical blade position to approximately a negative 5° bevel angle blade position.

6. The miter saw as set forth in claim 5 wherein the biasing mechanism includes a U-shaped spring member having first and second ends, and a keeper plate connected to the spring member and extending between the ends of the spring member.

7. The miter saw as set forth in claim 6 wherein the housing includes first and second oppositely disposed stop members, said first stop member engaging said first end of said spring member when the cutting unit is in the vertical, 0° bevel angle blade position and said second stop member engaging said second end of said spring member when the cutting unit is in the transverse, 45° bevel angle blade position.

8. The miter saw as set forth in claim 7 wherein each of the stop members are adjustable to allow selective adjustment of each of the stop members relative to the spring member.

9. A miter saw comprising:
a base having a horizontal support surface for supporting a workpiece;
a turntable mounted on the base for rotation about a vertical axis;
a support mounted on the turntable for movement therewith and including an outer, frustoconical bearing surface;
a bevel angle adjustment mechanism mounted on the support and including a housing having an inner, frustoconical bearing surface supporting the outer, frustoconical bearing surface of the support such that the inner and outer bearing surfaces move relative to one another and so that the housing is freely pivotable about a horizontal bevel angle axis, the bevel angle adjustment mechanism further including a biasing mechanism having a U-shaped spring member mounted on the support between the support and the housing of the bevel angle adjustment mechanism, the spring member having first and second ends, and a keeper plate connected to the ends of the spring member; and
a cutting unit including a cutting blade, the cutting unit mounted on the housing of the bevel angle adjustment mechanism for pivotal movement about a first horizontal axis between a cutting position and a non-cutting position, the bevel angle adjustment mechanism supporting the cutting unit for unbiased movement therewith about the bevel angle axis between a vertical, 0° bevel angle blade position relative to the horizontal support surface and a transverse, 45° bevel angle blade position and for biased movement therewith beyond these blade positions so that when the cutting unit is in the vertical blade position, the cutting unit is adjustable against the biasing force of the spring member from the vertical blade position to a −5° bevel angle blade position, and when the cutting unit is in the transverse, 45° bevel angle blade position, the cutting unit is adjustable against the biasing force of the spring member from the transverse blade position to a 50° bevel angle blade position.

10. The miter saw as set forth in claim 9 wherein the housing includes first and second oppositely disposed stop members, said first stop member engaging said first end of said spring member when the cutting unit is in the vertical, 0° bevel angle blade position and said second stop member engaging said second end of said spring member when the cutting unit is in the transverse, 45° bevel angle blade position.

11. The miter saw as set forth in claim 10 wherein each of the stop members are adjustable to allow selective adjustment of each of the stop members relative to the spring member.

12. A miter saw comprising:
a base having a horizontal support surface for supporting a work piece;
a turntable mounted on said base for rotation about a vertical axis;
a support mounted on said turntable for movement therewith about said vertical axis;
a biasing member connected to said support, said biasing member being a U-shaped spring member having first and second ends;
a keeper plate connected to said spring member adjacent said ends of said spring member; and
a cutting unit including a cutting blade, the cutting unit connected to said support for pivotal movement about a horizontal bevel angle axis, said cutting unit being freely pivotally moveable about said bevel angle axis between a vertical, 0° bevel angle blade position and a transverse, 45° bevel angle blade position, and said cutting unit being adjustable beyond said transverse, 45° bevel angle blade position against the biasing force of said biasing member, and said cutting unit including a housing connecting said cutting unit to said support, said housing including first and second oppositely disposed stop members, said first stop member engaging said first end of said spring member when said cutting unit is in said vertical, 0° bevel angle blade position and said second stop member engaging said second end of said spring member when said cutting unit is in said transverse, 45° bevel angle blade position.

13. A miter saw as set forth in claim 5 wherein said stop members are adjustable to allow selective adjustment of said stop member relative to said spring member.

14. A miter saw comprising:
a base having a horizontal support surface for supporting a workpiece;
a turntable mounted on the base for rotation about a vertical axis;
a support mounted on the turntable;

a bevel angle adjustment mechanism mounted on said support, said bevel angle adjustment mechanism including a housing movable with respect to the support about a horizontal bevel angle axis; and a cutting unit including a cutting blade, the cutting unit connected to the housing for pivotal movement about a horizontal axis perpendicular to the bevel angle axis between a cutting position and a non-cutting position; and the bevel angle adjustment mechanism supporting the cutting unit for movement relative to the horizontal support surface in a first direction from a vertical blade position, relative to the horizontal support surface, to a positive bevel angle blade position greater than 45° from the vertical blade position, wherein, when the cutting unit is in the vertical blade position relative to the horizontal support surface, said bevel angle adjustment mechanism also supports the cutting unit for movement in a second direction opposite to the first direction to a negative bevel angle blade position from the vertical blade position, wherein said bevel angle adjustment mechanism includes a biasing mechanism between the housing and the support such that the cutting unit is freely pivotally movable between a vertical, 0° bevel angle blade position and a transverse, 45° bevel angle blade position and the cutting-unit is movable in one direction against the biasing force of the biasing mechanism between the vertical, 0° bevel angle blade position and a transverse, negative bevel angle blade position and the cutting unit is movable in another direction rotationally opposite to the one direction and against the biasing force of the biasing mechanism between the transverse, 45° bevel angle blade position and a transverse bevel angle blade position greater than 45° from vertical, and wherein the biasing mechanism includes a U-shaped spring member having first and second ends, and a keeper plate connected to the ends of the spring member.

15. The miter saw as set forth in claim 14 wherein the housing includes first and second oppositely disposed stop members, said first stop member engaging said first end of said spring member when the cutting unit is in the vertical, 0° bevel angle blade position and said second stop member engaging said second end of said spring member when the cutting unit is in the transverse, 45° bevel angle blade position.

16. The miter saw as set forth in claim 15 wherein each of the stop members are adjustable to allow selective adjustment of each of the stop member relative to the spring member.

* * * * *